United States Patent
El Ghazzal

(10) Patent No.: US 11,792,141 B2
(45) Date of Patent: Oct. 17, 2023

(54) AUTOMATED MESSAGING REPLY-TO

(71) Applicant: Meta Platforms Technologies, LLC, Menlo Park, CA (US)

(72) Inventor: Sammy El Ghazzal, Adliswil (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 46 days.

(21) Appl. No.: 17/147,392

(22) Filed: Jan. 12, 2021

(65) Prior Publication Data
US 2022/0224659 A1     Jul. 14, 2022

(51) Int. Cl.
| | |
|---|---|
| *H04L 51/02* | (2022.01) |
| *G06N 20/00* | (2019.01) |
| *H04L 51/216* | (2022.01) |
| *H04L 51/212* | (2022.01) |

(52) U.S. Cl.
CPC .......... *H04L 51/02* (2013.01); *G06N 20/00* (2019.01); *H04L 51/212* (2022.05); *H04L 51/216* (2022.05)

(58) Field of Classification Search
CPC ......... H04L 51/02; H04L 51/16; H04L 51/12; H04L 51/212; H04L 51/216; H04L 51/04; G06N 20/00; G06F 16/3329
See application file for complete search history.

(56) References Cited

U.S. PATENT DOCUMENTS

| | | | | |
|---|---|---|---|---|
| 7,512,659 | B2 * | 3/2009 | Keohane | H04L 51/04 709/206 |
| 2004/0073616 | A1 * | 4/2004 | Fellenstein | G06Q 10/107 709/206 |
| 2006/0168026 | A1 * | 7/2006 | Keohane | H04L 51/04 709/206 |
| 2008/0183828 | A1 * | 7/2008 | Sehgal | H04L 51/04 709/206 |
| 2014/0280623 | A1 * | 9/2014 | Duan | H04L 51/02 709/206 |
| 2015/0350122 | A1 | 12/2015 | Roch et al. | |
| 2017/0250931 | A1 | 8/2017 | Ioannou et al. | |

(Continued)

OTHER PUBLICATIONS

European Search Report for European Application No. 22151157.9, dated May 25, 2022, 6 pages.

*Primary Examiner* — Nicholas R Taylor
*Assistant Examiner* — Tania M Pena-Santana
(74) *Attorney, Agent, or Firm* — Potomac Law Group, PLLC

(57) ABSTRACT

An automated messaging reply-to system can automatically select which message a potential reply message is replying to. The automated messaging reply-to system can obtain a message thread, a potential reply message, and a context. The automated messaging reply-to system can filter the message thread and generate model inputs based on the remaining messages, the potential reply message, and the context. The automated messaging reply-to system can apply the model input to a machine learning model, which can generate reply scores for the remaining messages. After generating reply scores, the automated messaging reply-to system can determine whether the remaining message with the highest reply score qualifies as an originating message being replied to. The automated messaging reply-to system can cause display of the potential reply message as a reply-to for the determined originating message.

20 Claims, 9 Drawing Sheets

(56) References Cited

U.S. PATENT DOCUMENTS

| | | | |
|---|---|---|---|
| 2017/0337199 A1* | 11/2017 | Kogan | H04L 51/02 |
| 2018/0089588 A1* | 3/2018 | Ravi | G06F 7/08 |
| 2018/0140099 A1* | 5/2018 | Peters | A47C 7/008 |
| 2018/0210874 A1 | 7/2018 | Fuxman et al. | |
| 2018/0367476 A1 | 12/2018 | Sharp et al. | |
| 2019/0033965 A1* | 1/2019 | Raghunath | G06F 3/04886 |
| 2019/0333020 A1* | 10/2019 | Zhao | G06Q 10/107 |
| 2020/0092243 A1* | 3/2020 | Milligan | H04L 51/216 |
| 2020/0327275 A1* | 10/2020 | McGinnis | G06F 3/04847 |
| 2020/0374243 A1* | 11/2020 | Jina | H04L 51/02 |
| 2020/0396187 A1* | 12/2020 | Woo | H04L 51/10 |

* cited by examiner

AUTOMATED MESSAGING REPLY-TO

TECHNICAL FIELD

The present disclosure is directed to computerized messaging platforms with automated reply functionality.

BACKGROUND

Messaging platforms and applications allow users to communicate with other users who are also online and logged into the same messaging platform and application. For example, social media platforms garner billions of active users every month across the world with various messaging functionality. By facilitating the creation and sharing of information, social media platforms have made the world more interconnected. Of the numerous forms of communication enabled by social media services, messaging applications are often the most used ways of communication between individuals. Users can send one another messages that involve text, emojis, links, images, videos, audio recordings, and various other forms of messaging content.

Numerous messaging platforms provide users such communication with various features that enhance the communication experience. Some of the various messaging platforms include instant messaging, email, SMS (short message service), MMS (multimedia messaging service), group messaging, etc.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
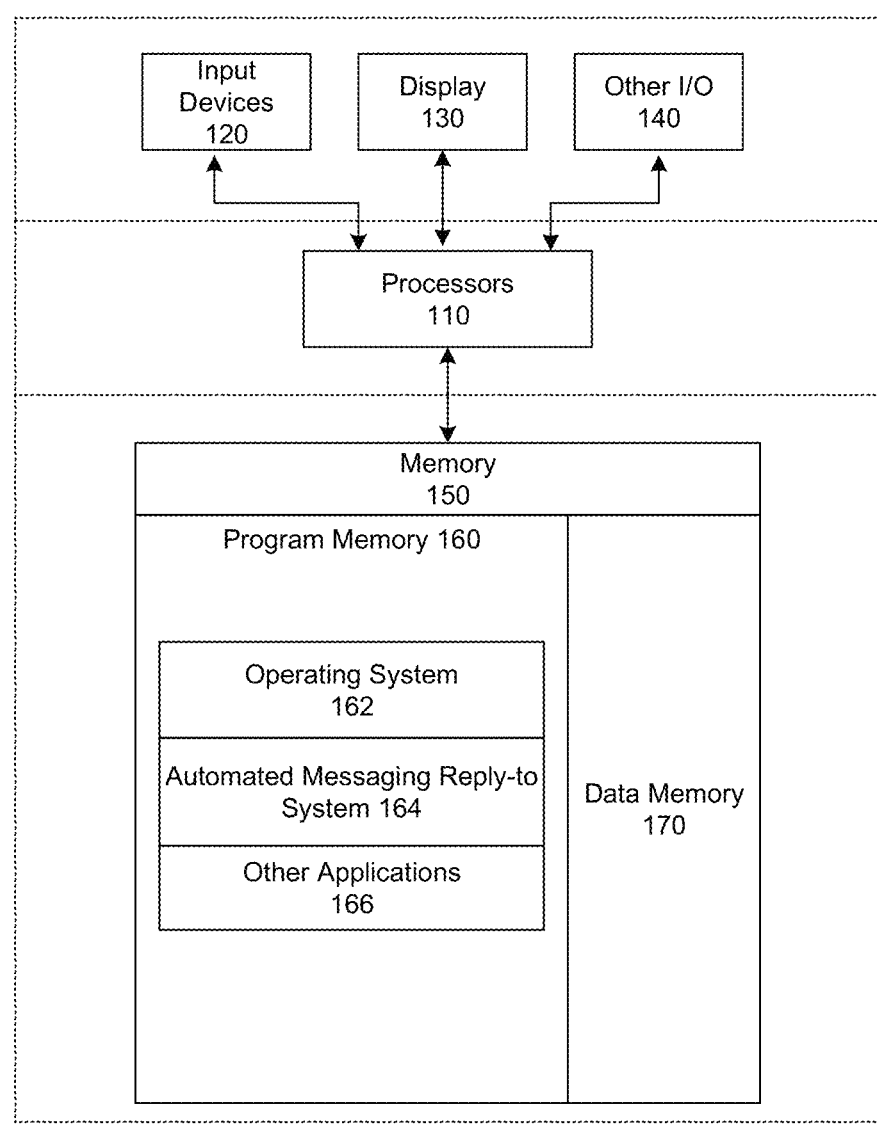
FIG. 1 is a block diagram illustrating an overview of devices on which some implementations can operate.

Aspects of the present disclosure are directed to an automated messaging reply-to system. When users are engaged in a conversation on a messaging platform, several messages can get exchanged and it can become difficult for users to know which message is replying to which other message. A user can send a reply message in response to a previous message in a message thread. As used herein a "message thread" is a set of messages exchanged between users on a messaging platform. The user may want a receiving user to know which previous message he/she is explicitly replying to. In some instances, a user can send a potential reply message and a receiving user can get confused as to whether the potential reply message is referring to a previous message and/or to which previous message the potential reply is referring to. As used herein a "potential reply message" is a message that may or may not be a reply to any previous message in a message thread.

The automated messaging reply-to system can automatically select originating messages for potential reply messages. As used herein, an "originating message" is any message to which a reply message is replying. In other words, the automated messaging reply-to system can automatically select which message, in a message thread, a potential reply message is a reply to. A user receiving a message can be relieved of the need to infer which sent message a received message is replying to. Further, a user sending a message does not have to manually indicate which message they are choosing to reply to. The automated messaging reply-to system can identify originating messages, and pair them with potential reply messages so that users can visualize the relationships between the messages. In some implementations, the automated messaging reply-to system can automatically select originating message groups. As used herein, an "originating message group" is any group of messages to which a reply message is replying. This can account for when a potential reply message is a reply to more than one message.

In some implementations, the automated messaging reply-to system uses a machine learning model to automatically determine originating messages. To prepare data to train the machine learning model, the automated messaging reply-to system can obtain reply-to instances, which can each be a tuple of: a reply message, a potential message being replied to, and a ground-truth label of True or False regarding whether the potential message being replied to is the originating message for the reply message (e.g., {reply message, potential message being replied to; True/False label}). In some implementations, the reply-to instances can be tuples generated from all possible combinations of pairs of messages from historical message threads of users on a messaging platform. For example, the tuples with True labels can include instances when a first user manually selected messages from a second user to reply to on the messaging platform (e.g., {first user's reply message, message from second user manually selected by first user to reply to, True}), while the tuples with False labels encompass all other instances in which no manual selection occurred. The automated messaging reply-to system can also obtain a context for each of the reply-to instances, which can include various contextual data of the messages in the reply-to instances. The contextual data can include, but is not limited to, results of subject analysis of messages, text features, analysis of associated content items in messages, timing features, the user messaging device context, or the user attention. Based on the reply-to instances and their corresponding contexts, the automated messaging reply-to system can generate model inputs for each reply-to instance and corresponding context pair. The model inputs can be text embeddings of the reply message and potential message being replied to, concatenated with a feature vector of the contextual data. In some implementations, the automated messaging reply-to system can generate model inputs by grouping reply-to instances that contain the same reply messages and have potential messages being replied to that are received by a user within a time window.

To train the machine learning model, the automated messaging reply-to system can apply the model inputs to the machine learning model, and the machine learning model can update its model parameters to learn to produce reply scores. A reply score can indicate for a reply-to instance how likely the potential message being replied to is the originating message for the reply message (e.g., a higher score can mean more likely, while a lower score can mean less likely). Thus, the machine learning model can be learning, based on identifying patterns in the model inputs, to determine which messages are actual replies to which messages. In some implementations, the reply score can indicate, for a reply-to instance, how likely a group of messages (potential messages being replied to that are received by a user within a time window of one another) is the originating message group for a reply message. Once the machine learning model is trained to produce reply scores, it can be provided for testing or deployment. Training the machine learning model is described in further detail below in relation to FIG. 4.

After the machine learning model is trained, the automated messaging reply-to system can use the machine learning model to automatically select originating messages for potential reply messages. The automated messaging reply-to system can obtain a message thread containing messages, along with a potential reply message and a context of the potential reply message. The message thread can include candidates for the originating message. The automated messaging reply-to system can determine which of the candidate messages are most likely the originating messages. In some implementations, the automated messaging reply-to system can filter messages of the message thread based on the context of the potential reply message. This can leave a set of unfiltered candidate messages. The automated messaging reply-to system can first filter messages with a lookback limit. The lookback limit can remove messages that were not on the replying user's screen within a threshold time. Through filtering based on the lookback limit, messages from the past that are unlikely to being replied to can be removed. For example, suppose the automated messaging reply-to system obtains the following message thread: User 1 sends a first message asking "Did you have a good day today" on Tuesday at 5:00 PM and User 1 sends a second message asking "Would you like to eat pizza" on Wednesday at 9:00 AM. If the lookback limit is 12 hours and the first message from User 1 was last seen by User 2 more than 12 hours ago, then the first message from User 1 would be filtered out in this example.

In addition to or alternatively to filtering by a lookback limit, the automated messaging reply-to system can filter messages with a cutoff limit. The cutoff limit can remove messages that were received after the replying user started typing the potential reply. These messages can be removed since they come after a user begins typing a potential reply message and are thus unlikely to be the message being replied to (a user wouldn't likely start replying to a message that doesn't exist yet). For example, suppose the automated messaging reply-to system obtains the following message thread: User 1 sends a first message asking "Did you have a good day today" on Tuesday at 5:00:00 PM and User 1 sends a second message asking "Would you like to eat pizza" on Tuesday at 5:00:11 PM. If User 2 starts typing a potential reply message at 5:00:10 PM of the same day, the second message from User 1 would be filtered out in this example because the second message was sent 1 second after User 1 started typing. Filtering the message thread is described in further detail below in relation to block 508 of FIG. 5 and FIG. 6.

After filtering the message thread based on the potential reply context, the automated messaging reply-to system can generate a reply score for each of the remaining messages (the unfiltered messages, or the original messages in the message thread if no filtering was performed) by: (1) generating model input based on the potential reply message, the remaining messages, and the context of the potential reply message; and (2) applying the model input to the machine learning model trained to produce reply scores. Each of the reply scores can indicate how likely the remaining message is the originating message. In some implementations, the automated messaging reply-to system can group the remaining messages that were received by a user within a time window and generates a reply score for the message groups. After generating reply scores for the remaining messages, the automated messaging reply-to system can identify the remaining message with the highest reply score. The remaining message with the highest reply score can be identified as the originating message. In some implementations, the automated messaging reply-to system can identify an originating message group with the highest reply score.

In some implementations, before identifying the originating message, the automated messaging reply-to system can determine whether the remaining message with the highest reply score qualifies as an originating message. The remaining message with the highest reply score can qualify when the highest reply score is above a threshold confidence value and/or is a threshold amount above all the other reply scores of the remaining messages. The thresholds can ensure there is sufficient confidence the message is the originating message.

In response to identifying the originating message and/or to determining that the remaining message with the highest reply score qualifies, the automated messaging reply-to system can cause display of the potential reply message as reply-to for the originating message. For example, the potential reply message and the identified originating message can be paired visually to show the reply-to relationship. This can allow a replying user to avoid manually indicating which message they are replying to, and the receiving user can visually understand which message the potential reply message is a reply to. In some implementations, the automated messaging reply-to system can display the potential reply message as a reply-to for the originating message group with the highest reply score. Automatically selecting which message a potential reply message is a reply to is described in further detail below in relation to FIG. 5.

As an example, suppose the automated messaging reply-to system obtains a message thread that includes the following: (User 1 and User 2 exchange several messages), User 1 sends a message asking "Did you have a good day today" on Tuesday at 5:00:00 PM, and a message "Would you like to eat pizza" on Tuesday at 5:00:10 PM. The automated messaging reply-to system also obtains a potential reply message from User 2 saying "Yes, I would like to" on Tuesday at 5:30:00 PM and the context of the potential reply message. The automated messaging reply-to system can then obtain a machine learning model trained on global user data and/or data from historical messages exchanged between User 1 and User 2. The automated messaging reply-to system can filter the exchanged message between User 1 and User 2 by a lookback limit or cutoff limit. After filtering, the automated reply-to messages can generate model inputs for the remaining unfiltered messages, apply the model inputs to the machine learning model, and generate the following reply scores: (scores all under 40 generated for remaining unfiltered messages exchanged between User 1 and User 2), score of 40 for the message "Did you have a good day today," and score of 85 for the message "Would you like to eat pizza." Assume for this example that the threshold confidence is set to 70 and the threshold margin between reply scores is set to 20. The highest reply score is 85, and since it is above the threshold confidence of 70 and is above the reply scores of all other messages by at least 20 (85−20=65, and 65>40), the message "Would you like to eat pizza" would qualify as the originating message being replied to. The automated messaging reply-to system can display "Yes I would like to" as a reply to the message "Would you like to eat pizza."

In some implementations, the automated messaging reply-to system can suggest one or more "reply to candidates" which the user can select from as the actual originating message she was replying to. For example, if the second-best candidate had a score of 70 (instead of 40 in the previous example), the automated messaging reply-to system can display the best and second-best scoring messages for the user to select from. Thus, instead of having a hard threshold on the margin, the automated messaging reply-to system can have a "suggestion threshold" where, when more than one messages has a score above this threshold, these messages are suggested to the user as suggested reply to candidates.

Various messaging platforms allow users to exchange messages back-and-forth with other users. These platforms often lack visual cues for users to distinguish which messages are replying to which other messages. As a result, a user can often get confused as to what previous message in a thread is a reply message from another user really referring to. Such difficulties become escalated when users have different messaging habits and diction, requiring users to be a lot more descriptive in their reply messages so that the recipient can understand which message they are responding to. Thus, users commonly must exchange longer descriptive messages and a greater volume of messages so that confusions are mitigated, resulting in increased traffic on messaging platforms. Some messaging platforms allow users to manually select messages to reply to. These platforms often require significant user interaction with the system, which can cause the messaging experience to feel often choppy, lacking in flow, and even irritating to use (e.g., users pressing many buttons to select many messages to reply to, users constantly selecting messages to reply to when the conversation is going back-and-forth fast, users scrolling up and down in the conversation to find and select a message to reply to). Such complications become further exacerbated when users are using their device one-handed, causing incorrect manual selections of the message to-reply functionality. Additionally, existing systems lack the option for users to select multiple messages (message groups) to reply to all at once and display them as being replied to.

The automated messaging reply-to system and processes described herein are expected to overcome these problems associated with conventional messaging platforms and are expected to provide users with an understanding of which messages are replies to which other messages in an automatic and robust fashion. By selecting originating messages for potential reply messages, the automated messaging reply-to system and processes can eliminate confusion as to which messages in a thread are being replied to. With less confusion in communication, receiving users no longer need to spend as much time inferring the messaging habits and diction of replying users. Replying users can spend less time elaborating on or being more descriptive in their reply messages since receiving users can automatically know what they are referring to. As a result, shorter messages and a lesser volume of messages can be exchanged across the messaging platform, resulting in reduced levels of computing resources needed. Messaging platforms can subsequently provide communication with less network capacity and less latency using the automated reply-to system and processes. Furthermore, because the automated reply-to system and processes utilize reliable heuristics to filter messages and rich contextual data to select originating messages, it can place less burden on having to train machine learning models that are computationally expensive and data hungry. Using the automated reply-to messaging system and processes, fewer training examples need to be provided, since the model can filter unlikely candidates for originating messages and exploit various patterns that require valuable contextual data. User-specific messaging data can also assist with reducing training time and prevent the model from having to generalize as much to many different users. The automated reply-to messaging systems and processes thus can use fewer, less powerful, and less costly computing devices, along with fewer, less capacious, and less costly storage devices.

The automated messaging reply-to system and processes described herein provides many benefits over user manual selection systems. By automatically selecting originating messages for potential reply messages on behalf of users, the automated messaging reply-to system and processes allow users to focus just on thinking of responses and typing the reply messages. This can drastically improve user experience when messaging. Conversations can flow better since users can put their attention into just thinking and replying, users can multitask better when they are messaging and doing some other task at the same time (especially when messaging with one-hand), and scrolling fatigue can be eliminated when users want to respond to older messages since the selections are already made for them. The ease of being able to receive automatic selections of messages for reply to functionality can make messaging smoother and more relaxing, especially when several messages are being exchanged in a short period and can be burdensome for a user to have to manually make selections. Because the automated messaging reply-to system and processes can generate reply scores for messages, it can quantify the likelihood of a message being an originating message, something not possible with manual selection systems. This measure is a valuable datapoint for understanding user replying behavior that is lacking in existing systems and methods. Further, because user correction feedback can be provided, the automated reply-to messaging system and processes can be personalized to the user and reduce errors in model selection, making it robust and reliable. Additionally, when users want to respond to more than one message at once, the automated reply-to messaging system and processes can select originating message groups and cause display of the selection, something existing messaging platforms also lack.

Several implementations are discussed below in more detail in reference to the figures. FIG. 1 is a block diagram illustrating an overview of devices on which some implementations of the disclosed technology can operate. The devices can comprise hardware components of a device 100 that can automatically select messages to reply to on a messaging platform. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, automated messaging reply-to system 164, and other application programs 166. Memory 150 can also include data memory 170, e.g., training datasets of reply-to instances, contextual data for the reply-to instances, machine learning models to be trained or already trained, machine learning models to retrain or finetune, message threads, potential reply messages, contextual data for the potential reply messages, lookback limit values, cutoff limit values, computed reply scores, visual data for user interfaces, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
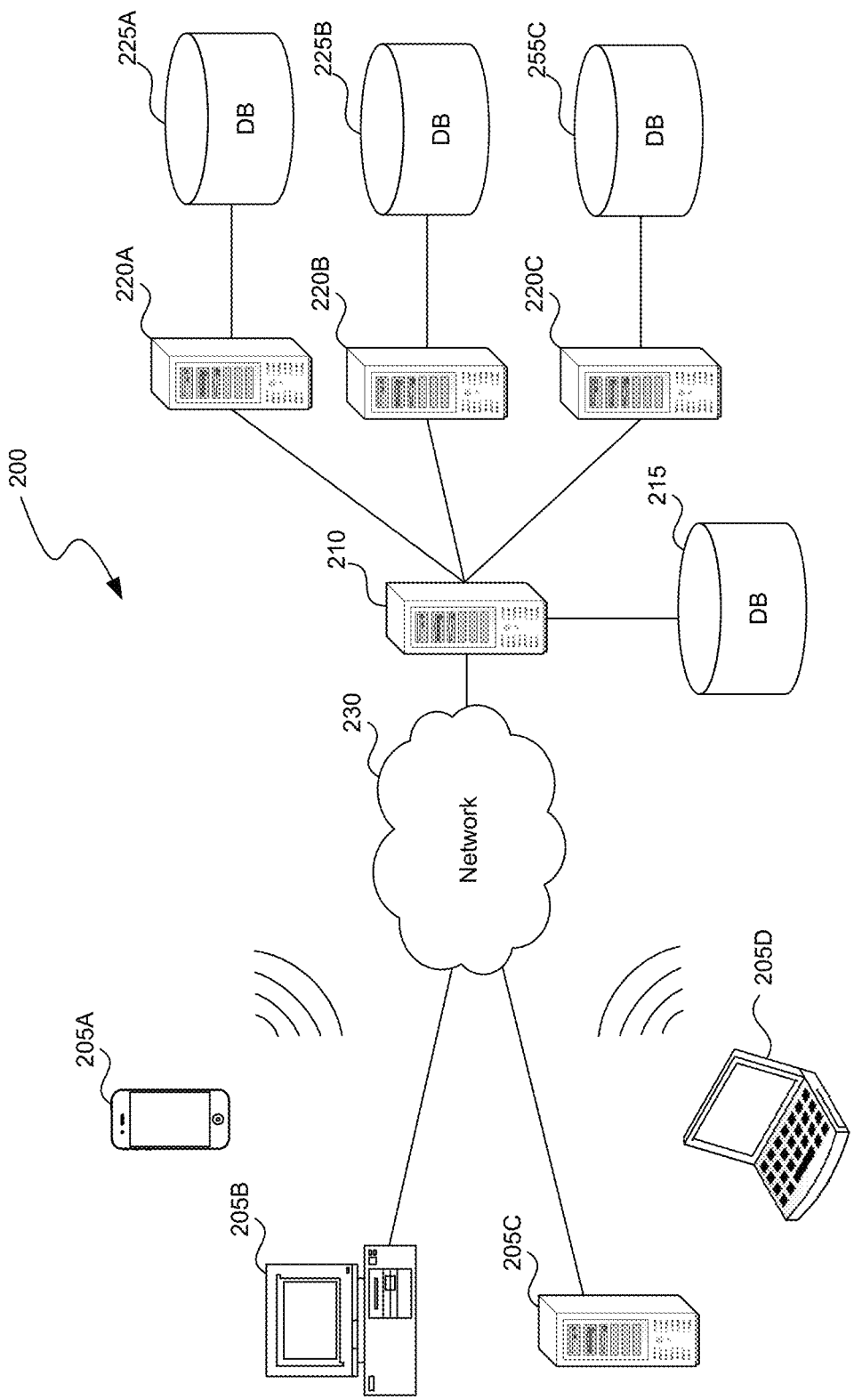
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as training datasets of reply-to instances, contextual data for the reply-to instances, machine learning models to be trained or already trained, machine learning models to retrain or finetune, message threads, potential reply messages, contextual data for the potential reply messages, lookback limit values, cutoff limit values, computed reply scores, visual data for user interfaces. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

In some implementations, servers 210 and 220 can be used as part of a social network. The automated messaging reply-to system described herein can be used for any type of messaging system, not just those implemented by a social network system. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g. indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g. longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users; can enable a user to post a message to the user's wall or profile or another user's wall or profile; can enable a user to post a message to a group or a fan page; can enable a user to comment on an image, wall post or other content item created or uploaded by the user or another user, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, or an instant message external to but originating from the social networking system. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 3:
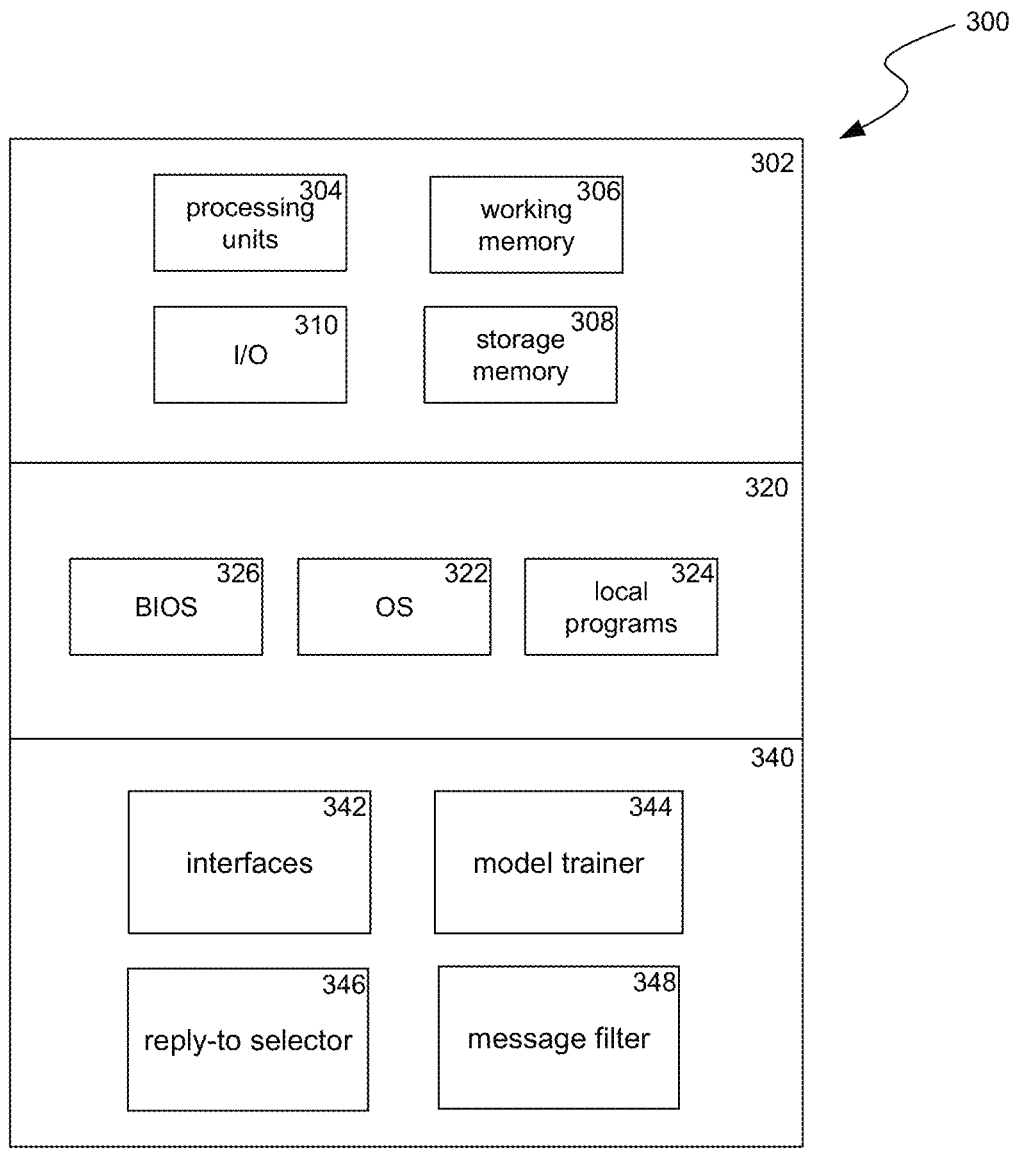
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include, for example, model trainer 344, reply-to selector 346, message filter 348, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Model trainer 344 can prepare training data for a machine learning model, train the machine learning model to generate reply scores for messages, and provide the trained machine learning model for testing or deployment. In some implementations, model trainer 344 can prepare training data from a dataset of reply-to instances that can be obtained from storage memory 308. Model trainer 344 can also determine a context for the reply-to instances, which include various contextual data related to the messages in the reply-to instances and can be obtained from storage memory 308 as well. Model trainer 344 can generate model inputs from the reply-to instances and their corresponding contexts, apply the model inputs to a machine learning model, and train the machine learning model. The machine learning model can comprise a neural network, recurrent neural network, convolutional neural network, ensemble method, cascade model, support vector machine, decision tree, random forest, logistic regression, linear regression, genetic algorithm, evolutionary algorithm, etc. After training the machine learning model, model trainer 344 can provide the trained machine learning model to reply-to selector 346 for testing or deployment. Additional details on training a machine learning model to generate reply scores are provided below in relation to blocks 402 through 412 of FIG. 4.

Reply-to selector 346 can automatically select which candidate message, in a message thread, is the originating message for a potential reply message. To make the selection, reply-to selector 346 can obtain and use the machine learning model provided by model trainer 344. In addition to obtaining the machine learning model, reply-to selector 346 can obtain a potential reply message, contextual data related to the potential reply message, and a message thread with candidates for being the originating message for the potential reply message, all from storage memory 308 and/or working memory 306. In some implementations, reply-to selector 346 can provide the message thread and contextual data to message filter 348 for pre-processing the data via filtering. As discussed below, message filter 348 can filter messages in the message thread and provide unfiltered messages back to reply-to selector 346 for further processing. Reply-to selector 346 can generate a reply score for each of the remaining messages (the unfiltered messages, or the original messages in the message thread if no filtering was performed) by applying the obtained machine learning model to each of the remaining messages. If the message with the highest reply score qualifies as the message being replied to, then reply-to selector 346 can select the message with the highest reply score as the originating message. An indication of this selection can be communicated to a computing device of the user who sent the originating message, via interfaces 342. In some implementations, the selection can cause the potential reply messages to be displayed as a reply to the selected originating message via I/O 310 and/or via the computing device of the user who sent the originating message. Additional details on automatically selecting messages being replied to are provided below in relation to blocks 502 through 514 of FIG. 5.

Message filter 348 can filter messages in a message thread based on contextual data. In other words, message filter 348 can preprocess a message thread before it is further processed by reply-to selector 346. Message filter 348 can first obtain a message thread and contextual data of a potential reply message provided by reply-to selector 346. To filter messages in the message thread, message filter 348 can evaluate the contextual data to determine a lookback limit and/or cutoff limit. The lookback limit can remove messages that were not on a replying user's screen within a threshold time. The cutoff limit can remove messages that were received after the replying user started typing the potential reply message. After filtering, message filter 348 can provide the remaining messages (unfiltered messages) back to reply-to selector 346 for further processing. Additional details on filtering a message thread are provided below in relation to blocks 602 through 608 of FIG. 6.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
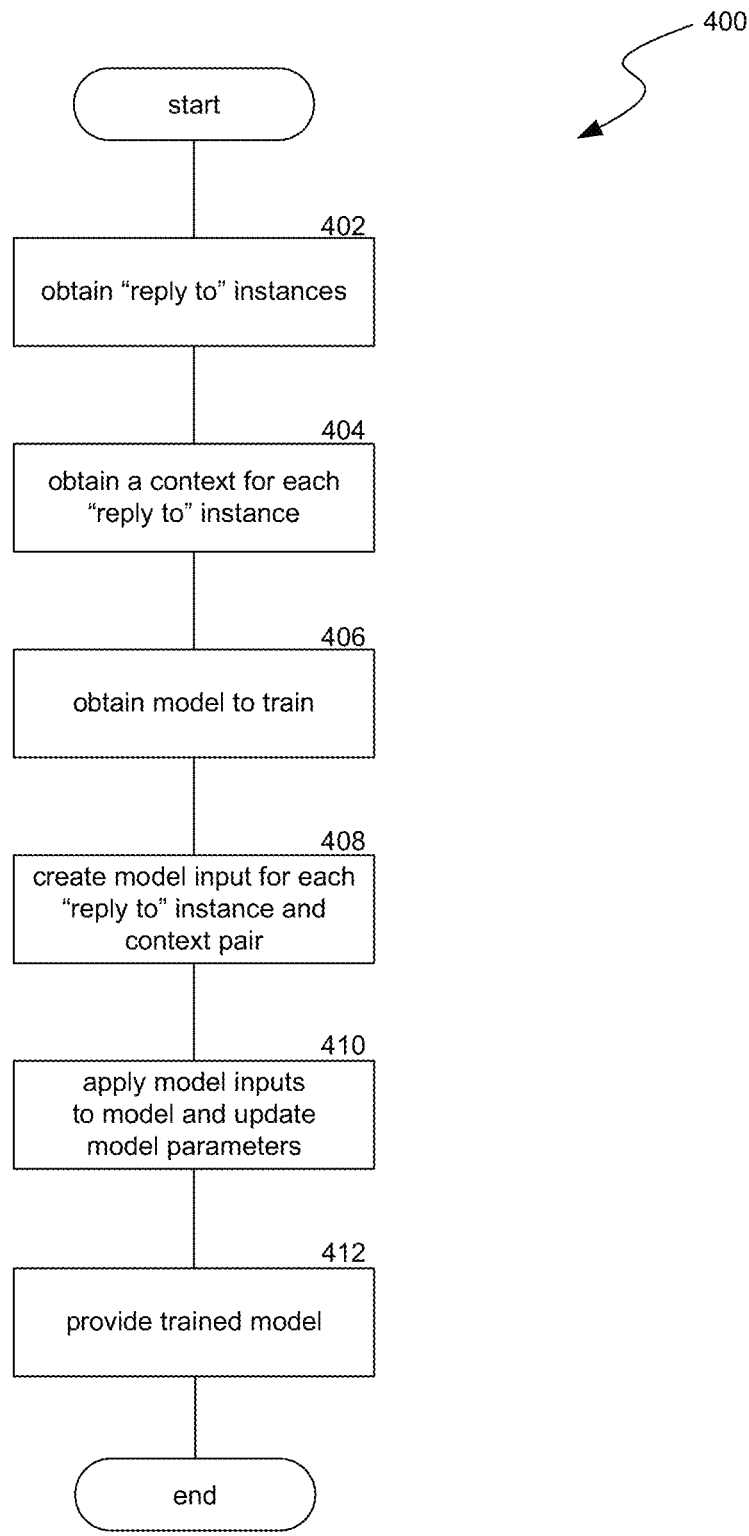
FIG. 4 is a flow diagram illustrating a process used in some implementations for training a machine learning model to produce reply scores.

FIG. 4 is a flow diagram illustrating a process 400 used in some implementations for training a machine learning model to produce reply scores. In some implementations, process 400 can be performed in response to an administrator command to train a machine learning model on a specified data source. In other implementations, process 400 can be performed or repeated in response to when additional user-specific messaging data becomes available e.g., when a user manually selects messages to reply to, when a user makes corrections to model selections of originating messages. In various implementations, process 400 can be performed on a server device (e.g., a server of a messaging platform that communicates messages sent between users, processes messaging data between different users, and can compute reply scores for messages) or a client device (e.g., a user device for sending messages to and receiving messages from other user devices on a messaging platform, processes messaging data communicated with other user devices, and can compute reply scores for messages). Process 400 can be performed on a client device to maintain privacy of user-specific messaging data and account for instances when the client device is offline and cannot be connected to a server. When complete, process 400 can provide a trained machine learning model, e.g., for use in process 500 of FIG. 5 at block 502.

At block 402, process 400 can obtain one or more reply-to instances. The reply-to instances can be data records each represented by a tuple datatype of: a reply message, a potential message being replied to, and a ground-truth label of True or False regarding whether the reply message is an actual reply to the potential message being replied to (e.g., {reply message, potential message being replied to; True/False label}). For example, a reply-to instance can be, {"I am doing good", "How are you today?", True}, while another reply-to instance can be {"I like playing basketball", "Want to grab pizza for dinner", False}, etc. In some implementations, process 400 can obtain the reply-to instances from a dataset of historical messages exchanged between all or a subset of users on a messaging platform (global messaging data). The dataset can include all (or alternatively a subset of) possible combinations of labeled pairs of messages extracted from historical message threads of users. For example, the tuples with True labels can include instances when users manually selected messages from other users to reply to on the messaging platform (e.g., {first user's reply message, message from second user manually selected by first user to reply to, True}), while the tuples with False labels can encompass all other instances in which no manual selection occurred. In other implementations, process 400 can obtain the reply-to instances from a dataset of historical messages sent from and received by just a single user on a messaging platform. The dataset can include all (or alternatively a subset of) possible combinations of labeled pairs of messages extracted from historical message threads of the single user.

Process 400 can further obtain reply-to instances from a dataset of a single user when a machine learning model is to be fine-tuned or retrained with user specific messaging data. This can help a machine learning model fit better to the single user's messaging behavior and needs, since the model can see specific training examples of the single user's messages with other users, can better focus on learning the reply behavior of the single user to other users, and can avoid having to rely on generalizing as much to data from various different users. In various implementations, process 400 can obtain both global messaging data and user-specific messaging data to use for training a machine learning model.

In some implementations, additional user-specific training data can include instances when users made manual corrections to model selections. In other words, the data records obtained can include instances of when a user manually corrected originating messages selected by process 500 in FIG. 5. The user correction can occur at block 514 of FIG. 5. For example, a user interface of a messaging platform can include an option for the user to indicate whether an originating message selected is incorrect (e.g., a "remove selection" user interface button, an "X" user interface element to press). For example, suppose a message "Do you like pie" is selected as the originating message for the potential reply message "I do like playing basketball." In this example, the user can press a "remove selection" button on their messaging platform to correct the model selection (basketball and pie are unrelated). User corrections can be useful for penalizing a machine learning model trained to produce reply scores, since they represent instances when the trained machine learning model made a wrong selection of an originating message. They can provide negative training examples for the model to be retrained on and improve from. The model can better understand what types of messages are less likely to be originating messages for certain reply messages. User corrections can also provide user feedback to the machine learning model as to how well it is performing. Several user corrections can indicate that the model is not performing well, while a few user corrections can indicate that the model is performing well.

In some implementations, process 400 can assign a greater training weight to the data records of user-specific training data to account for the training improvements they provide to the machine learning model. Data records assigned with greater training weights can have a greater effect on the model compared to other data records during training.

At block 404, process 400 can obtain a context for each of the one or more reply-to instances. Process 400 can obtain the context from a dataset of various contextual data records collected for each of the reply-to instances. Process 400 can collect the contextual data from the messages of the reply-to instances (the reply message and/or the potential message being replied to) or from components of the replying messaging and/or receiving users' devices including, but not limited to, timers/clocks, location/GPS services, internet connectivity, cameras, etc. Process 400 can subsequently use all or a subset of the contextual data as features (contextual features) of a machine learning model (e.g., generating a feature vector from the contextual data to input into a model). The contextual data can include, but is not limited to, results of subject analysis of messages, text features, analysis of associated content items in messages, timing features, the user messaging device context, or the user attention.

In some implementations, subject analysis of messages can include determining what the subject of discussion is in messages. For example, analysis of a reply-to instance can determine that a message is talking about food, work, or any other subject. Process 400 can apply subject analysis to the messages of the reply-to instances, and the subject analysis can be useful for including in a feature vector to later input to a machine learning model. Using the subject analysis and other contextual features described herein, the model can learn patterns from such as: messages are more likely to be originating messages for reply messages that share the same subject of discussion or certain users like to send reply messages with a specific lingo/language/tone/diction/syntax for specific subjects. For example, a message that discusses the subject of food (e.g., "I love pasta") is more likely to be the originating message for a reply message that also discusses the subject of food (e.g., "I prefer pizza instead"). On the other hand, a message that discusses the subject of food (e.g., "Do you like pizza?") is less likely to be the originating message for a reply message that in contrast discusses the subject of work (e.g., "I had a rough day at the office"). As another example, a user may like to reply with the message "LOL," which stands for "laugh out loud," to originating messages that contain a funny remark or joke as its subject.

In some implementations, text features can include various features related to the textual content of messages. Examples of text features for a message can include, but are not limited to, the length of the message, the parts-of-speech tags for the message, the words contained in the message, and/or a type analysis of the message. Type analysis can refer to determining whether a message contains a question, a remark, etc. Process 400 can extract text features from the messages of the reply-to instances, and the text features can be useful for including in a feature vector to later input to a machine learning model. Using the text features and other contextual features described herein, the model can learn patterns such as: shorter messages tend to be replies to other shorter messages, longer messages tend to be replies to other longer messages, messages with verbs tend to be replies to messages that ask about an action, messages with nouns tend to be replies to messages that ask about an object or living thing, messages with adjectives tend to be replies to messages that ask for some description, messages that ask questions or make remarks are more likely to be originating messages, messages with certain words tend to be replies to messages with specific words as well depending on a user's lingo, language, tone, diction, or syntax. As an example, a relatively shorter message that says, "What's up," is more likely an originating message for a relatively shorter reply message that says, "Not much," rather than a relatively longer reply message that says, "It has been good, how about you?" As another example, a message that asks, "What'd you do this week," is more likely an originating message for a reply message with a verb as its focus that says, "I went fishing," rather than a message with an adjective as its focus that says, "The fish were delicious." As a further example, a message that says, " . . . ?" is more likely an originating message since it contains a question mark, or a message that says, "I definitely prefer cats to dogs" is more likely an originating message since it is a strong opinion that can warrant a response. While in some implementations, the type of inference described above, and those described below, can be explicitly made by the system, in other implementations, inferences between message context (or sets of multiple message context features) and whether it is a reply message can be encoded in the training of the machine learning model without explicitly determining a rationale for the relationship.

In some implementations, analysis of associated content items in messages can first include determining that messages contain content items. A content item can include, but is not limited to, a link, a picture, an audio clip, or a video. Analysis can further identify, in relation to the content item, an object identification tag, a hash tag, a topic identifier, a video length, a sound length, who posted on social media, who liked a social media post, and/or any other metadata of the content item. Process 400 can apply analysis of associated content items to the messages of the reply-to instances, and the analysis of associated content items can be useful for including in a feature vector to later input to a machine learning model. Using the analysis of associated content items and other contextual features described herein, the model can learn patterns such as: a message with a picture/video link or attachment is more likely an originating message for a reply message that mentions something in the picture/video link, a message that shares a social media post or references a social media poster is more likely an originating message for a reply message that makes a comment about the social media post or poster, a message that shares a long video/sound clip is more likely an originating message for a long reply message that comments about the video/sound clip, a message that shares a short video/sound clip is more likely an originating message for a short reply message that comments about the video/sound clip, a message with an object identification tag or hash tag is likely sharing the information of a message it is replying to, a message with the same or a similar topic identified as another is more likely to be a reply to it.

For example, a message that says, "Watch this cool video: (insert link of video with someone doing a stunt)," is likely an originating message for a reply message that says, "Wow, this guy is crazy." As another example, a message that says, "Meghan is competing tomorrow," is more likely an originating message for a reply message that says, "#gomeghan." As another example, a message with a funny video attachment is more likely an originating message for a reply message that says, "ROFL," which stands for "rolling on the floor laughing." As a further example, a message that includes a link to a movie is more likely an originating message for a long analysis message of the movie that says "I really enjoyed the character development and emotions captured. Certain moments gave me a lot of goosebumps. I think it will likely win several awards."

In some implementations, timing features can include various features such as when a message was sent, when a message was read, and/or how much time a message stayed in focus on a replying user's screen. Process 400 can extract timing features from recorded timestamps of the messages of the reply-to instances, and the timing features can be useful for including in a feature vector to later input to a machine learning model. Using the timing features and other contextual features described herein, the model can learn patterns such as: a message that was sent earlier is more likely an originating message for a reply message that was sent earlier as well, a message that was sent later is more likely an originating message for a reply message that was sent later as well, a message that stayed as only being read but answered for a long time is likely an originating message for a more complex reply message (user thought about the response for some time since the it's a complex answer), a message that stayed as only being read but not answered for a long time is likely an originating message for a reply message sent at a time when the replying user is more free to think of an answer, a message that stays in focus longer on a replying user's screen while the replying user is typing a reply message is more likely the originating message for that reply message being typed. For example, suppose User 1 sends a set of messages to User 2, and User 2 replies with a set of messages to User 1. The messages sent earlier in User 1's set are more likely the originating messages for the messages sent earlier in User 2's replies, while the messages sent later in User 1's set are more likely the originating messages for the messages sent later in User 2's replies. This behavior of replying to messages in order can be common, although the reverse can also be true depending on the user's messaging behavior. As another example, suppose a message from User 1 stays in focus for a while on User 2's screen, and User 2 begins typing a reply message. The message that stayed in focus is likely the originating message for the reply message.

In some implementations, device context can include information regarding where the replying user was when a message was sent and/or whether the message was sent after a period of internet disconnection. Using device context and other contextual features described herein, the model can capture scenarios such as: a message sent from a specific location of the replying user is likely replying to a message that asks about something related to that specific location (e.g., weather, event going on, traffic, etc.), a message sent after a period of internet disconnection is likely replying to an older message. For example, suppose User 1 sends a message to User 2 saying "How is Brooklyn currently?" If User 2 sends a message from Brooklyn, then it is more likely to be a reply to User 1's message than a message not sent from Brooklyn.

In some implementations, process 400 can determine user attention by first using a camera (e.g., front camera of user device) to compute where the replying user is looking. Process 400 can employ various computer vision techniques to track the eyes of the replying user and where they are glancing on the screen. Then, process 400 can determine, based on where the replying user is looking, the message(s) the replying user is looking at during a given time and/or how much time the replying user spent looking at the message(s). Using user attention and other contextual features described herein, the model can capture a scenario such as: a user stars typing an answer but takes one or more looks at the message they are replying to in order to make sure they answer the question correctly. For example, User 2 can be looking at a message from User 1 to reply to, and then begins typing a reply message. While typing the reply message, User 2 can look back at the message from User 1 to make sure they understood the question correctly. In this scenario, the message from User 1 that User 2 looked at is likely the originating message for User 2's reply message being typed.

At block 406, process 400 can obtain a machine learning model to train on the reply-to instances and contexts. The machine learning model can comprise a neural network, recurrent neural network (RNN), long short-term memory network (LSTM) convolutional neural network (CNN), ensemble method, cascaded models, support vector machine (SVM), decision tree, random forest, logistic regression, linear regression, genetic algorithm, evolutionary algorithm, or any other model or combination of models.

At block 408, process 400 can create model inputs for each of the reply-to instances and corresponding context pair. Process 400 can generate model inputs by representing the text of the reply message and/or potential message being replied to as an embedding, and then concatenating that text embedding with a feature vector of the contextual data. The form of the model inputs can depend on the architecture or model used. In some implementations, process 400 can generate the model inputs for use by a recurrent neural network model, where the input recurrence is on the text embedding and feature vector of the contextual data. For example, the inputs to the recurrent neural network can be a sequence of word embeddings of the reply message and/or potential message being replied to, followed by the feature vector of contextual data. In other implementations, process 400 can generate the model inputs for use by an ensemble model, where the text embedding can be used as inputs to a recurrent neural network of the ensemble and the feature vector of contextual data can be used as inputs of a deep feedforward neural network of the ensemble. In various implementations, process 400 can generate the model inputs for use by an architecture comprising a convolutional neural network cascaded with a recurrent neural network. The convolutional neural network can take as input a feature vector of a linked video/photo in the reply message and/or potential message being replied, and output a vector representing the subject of the video/photo. For example, the convolutional neural network can identify that a photo is a picture of a dog and output an embedding for "dog" or a more generic embedding "pet." As another example, the convolutional neural network can identify that a video is about a food review and output an embedding for the subject "food." Process 400 can subsequently include the outputted subject as additional contextual data in its feature vector to be concatenated with the text embedding, and then use that for the recurrent neural network in the cascade. The architectures and models described above are examples of possible configurations used and are not the only ones that process 400 is limited to.

In some implementations, before applying the generated model inputs to the model, process 400 can group reply-to instances that contain the same reply messages and have potential messages being replied to that are received by a user within a time window. In other words, if a reply-to instance shares the same reply message as and has a potential message being replied to within a time window of that of another reply-to instance, then they can be grouped. The time window can be a predefined threshold time value (e.g., in nanoseconds, milliseconds, seconds, minutes, etc.) fine-tuned to produce the best groupings of messages. For example, suppose a reply-to instance 1 has a reply message that says "Yes! I like that idea" and a potential message being replied to that says, "Did you enjoy our trip to Europe?" (received by user at 12/12/2020 at 09:00 AM). Then suppose that a reply-to instance 2 has a reply message that says "Yes! I like that idea" and a potential message being replied to that says, "Want to go there next summer again?" (received by user at 12/12/2020 at 09:01 AM). In this example, if the time window is predefined to be greater than 1 minute, then process 400 can group reply-to instance 1 and reply-to instance 2 together since they have the same reply message and their potential message being replied to are within 1 minute of each other. Grouping messages can account for scenarios when a reply message is potentially replying to more than one message (e.g., replying to a set of messages received all within a time window of one another). Providing training examples of grouped messages to the machine learning model can enable it to learn these scenarios. For example, the reply message "Yes! I like that idea" can be a reply message to both "Did you enjoy our trip to Europe?" and "Want to go there next summer again?" which were both received within a narrow time window of one another. The phrase "Yes!" can be referring to enjoying the trip to Europe, while the phrase "I like that idea" can be referring to wanting to go next summer again. To group reply-to instances, process 400 can combine the text embeddings and/or feature vectors of contextual data via concatenation, summing, averaging, weighted mean, or any other aggregation method. The machine learning model can learn that these messages can be treated as a group during training.

At block 410, process 400 can apply the generated model inputs to the obtained machine learning model and update model parameters (e.g., weights, coefficients, hyperparameters, etc.) to train the model. Process 400 can train the machine learning model to output reply scores. The reply score outputted for a reply-to instance can be a numerical value representing how likely the potential message being replied to is the originating message for the reply message. A higher value can indicate a message is more likely an originating message, while a lower value can indicate a message is less likely an originating message. By producing a reply score, the machine learning model can quantify the likelihood of messages being originating messages. During training, the machine learning model can learn to produce high reply scores for reply-to instances with True labels, since the potential message being replied to is labeled as an actual originating message for the reply message. On the other hand, the machine learning model can learn to produce low reply scores for reply-to instances with False labels, since the potential message being replied to is not labeled as an actual originating message for the reply message. The machine learning model can use various loss functions including, but not limited to, mean absolute error loss, cross-entropy loss, Huber loss, fair loss, asymmetric loss, or mean square error loss to update its model parameters and carry out training.

At block 412, process 400 can provide the trained machine learning model for testing, deployment, or further processing. In some implementations, process 400 can provide the trained machine learning model to process 500 of FIG. 5 at block 502 to generate reply scores for potential reply messages. Process 400 can provide the machine learning model when requested just in time or on a periodic schedule (e.g., predefined schedule for requesting trained models).

Figure 5:
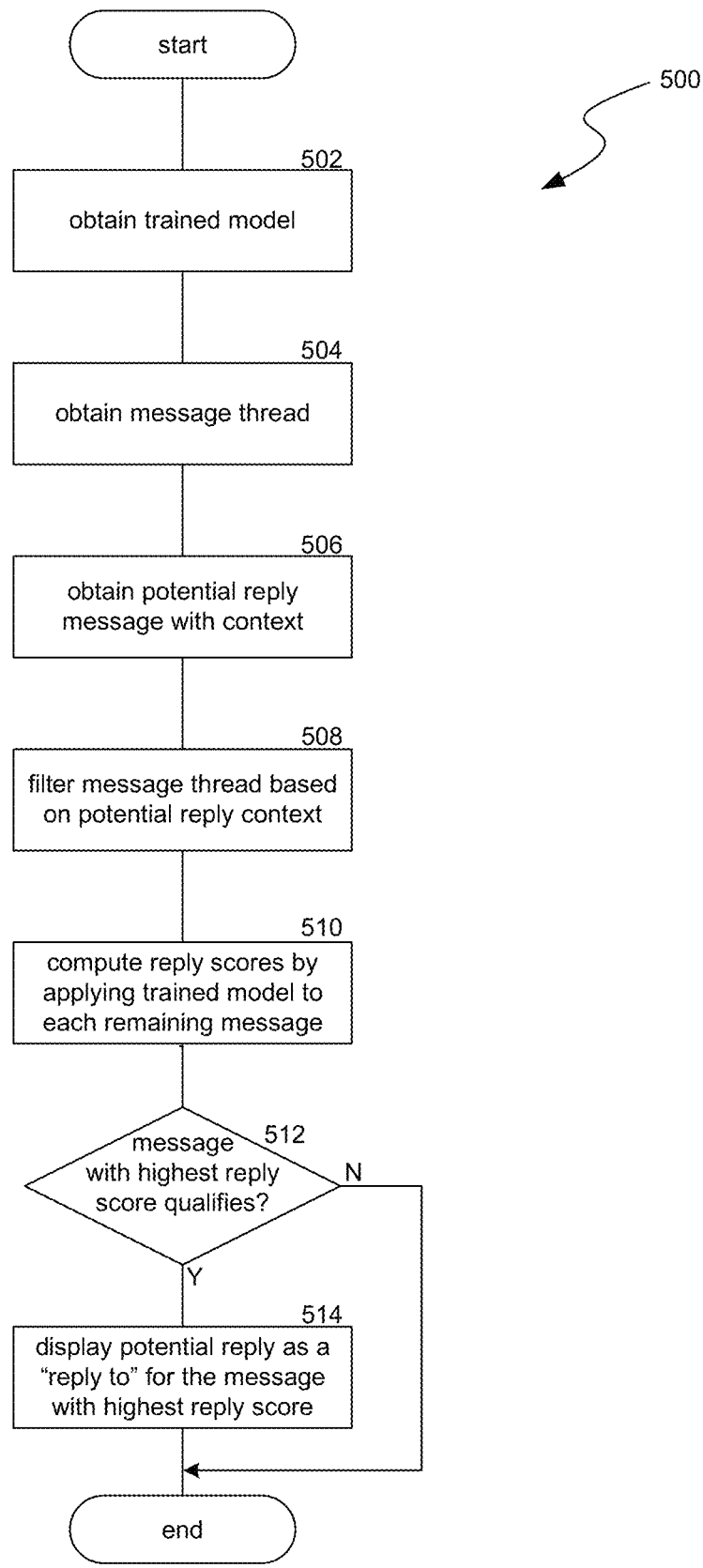
FIG. 5 is a flow diagram illustrating a process used in some implementations for automatically selecting originating messages for potential reply messages.

FIG. 5 is a flow diagram illustrating a process 500 used in some implementations for automatically selecting originating messages for potential reply messages. In some implementations, process 500 can be performed in response to a to a replying user sending a potential reply message in an existing message thread. In various implementations, process 500 can be performed on a server device (e.g., a server of a messaging platform that communicates messages sent between users, processes messaging data between different users, and can compute reply scores for messages) or a client device (e.g., a user device for sending messages to and/or receiving messages from other user devices on a messaging platform, processes messaging data communicated with other user devices, and can compute reply scores for messages). Process 500 can be performed on a client device to maintain privacy of user-specific messaging data and account for instances when the client device is offline and cannot be connected to a server.

At block 502, process 500 can obtain a machine learning model trained to produce reply scores from process 400 of FIG. 4 at block 412. In some implementations, the machine learning model can be trained on a global dataset in process 400 and can be further retrained or fine-tuned on user-specific messaging data of the user sending and/or receiving the potential reply message. The user-specific messaging data can comprise instances when the user manually selected messages to reply to or made corrections to model selections of originating messages at block 514. In some implementations, the user-specific messaging data can further comprise selections made by process 500 that are not corrected by the user sending/receiving the potential reply message. The uncorrected model selections can represent instances when the machine learning model made the right selection for the user, hence serving as a valuable datapoint. The right selection can provide feedback to the model as to instances when it performs well. In some implementations, the retraining or fine-tuning of the obtained machine learning model can occur when process 500 has executed a predefined threshold number of times. This can be to ensure that process 500 has executed enough times to form a large enough dataset of user-specific training examples for retraining or fine-tuning the model on. When the machine learning model is retrained, process 400 of FIG. 4 is repeated.

At block 504, process 500 can obtain a message thread containing messages exchanged between a user sending the potential reply message and the user receiving the potential reply message. As examples, message threads can be obtained from instant message platforms, text message conversations, email conversations, etc. The messages exchanged in the message thread (minus the potential reply message itself) can be candidates for the originating message to be selected for the potential reply message by process 500. In other words, the potential reply message can be a reply to any of the previous messages in the message thread. The message thread can include messages between users discussing one or more different topics (e.g., work, food, sports, relationships, etc.). As an "Example A" to be used in the below further discussion of process 500, a message thread can include the following: (a set of messages exchanged between User 1 and User 2 before Tuesday at 5:00:00 PM), User 1 sends a message asking "Did you have a good day today" on Tuesday at 5:00:00 PM, and a message "Would you like to eat pizza" on Tuesday at 5:00:10 PM.

At block 506, process 500 can obtain the potential reply message itself from the replying user, along with a context of the potential reply message. The potential reply message can be the most recent message from the replying user and can be a reply to any of the messages in the obtained message thread. The context of the potential reply message can include any of the forms of contextual data described in relation to block 404 of FIG. 4. The contextual data can be extracted from the potential reply message itself, extracted from the messages of the message thread, obtained from the device of the user sending and/or receiving the potential reply message, or any combination thereof. Returning to Example A, suppose that process 500 obtains a potential reply message from User 2 saying "Yes, I would like to" on Tuesday at 5:30:00 PM of the same day. The potential reply message can be replying to any of the messages in the message thread, including "Did you have a good day today" and "Would you like to eat pizza." In this example, process 500 can also obtain the context of the potential reply message (e.g., subject analysis of the message "Would you like to eat pizza" to determine it's about pizza, determining the length of the potential reply message to have 5 words, determining the time the potential reply message was sent Tuesday at 5:30:00 PM while the message "Did you have a good day today" was sent Tuesday at 5:00:00 PM, identifying that User 2 was looking at the message "Would you like to eat pizza" when typing the potential reply message, etc.)

At block 508, process 500 can filter the messages of the obtained message thread based on the context of the potential reply message. Process 500 can filter the messages by providing the message thread and potential reply context to process 600 of FIG. 6 in block 602. In some implementations, process 600 of FIG. 6 can filter the message thread by removing messages that were not on the screen of the user that sent the potential reply message within a threshold time. Returning to Example A, suppose a specific message of the set of messages exchanged between User 1 and User 2 before Tuesday at 5:00:00 PM was received on Tuesday at 9:00:00 AM by User 2. If the threshold time is predefined as 2 hours before the potential reply message was sent in Example A, then the specific message would be removed. In some other implementations, process 600 can filter the message thread by removing messages that were received after the replying user started typing the potential reply message. In Example A, suppose a specific message was received on Tuesday at 5:30:11 PM while User 2 was typing the potential reply message. Since the specific message was received 1 second after the replying user started typing, then the specific message would be removed. After filtering is performed, process 500 can obtain the remaining messages (the unfiltered messages) from process 600 of FIG. 6 at block 608. Filtering can be performed as a data pre-processing step to remove messages that are unlikely to be the originating message based on heuristics. This can reduce the burden of the machine learning model having to also learn such heuristics on top of other patterns that are difficult to be determined via heuristics alone. In some implementations, process 500 can skip the filtering step, and thus the remaining messages are just all the messages of obtained the message thread. Filtering the message thread is described in further detail below in relation to FIG. 6.

At block 510, process 500 can compute reply scores for each of the remaining messages of the message thread by applying the obtained trained machine learning model to each remaining message. Process 500 can compute reply scores by first generating model input based on the potential reply message, the remaining messages, and the context of the potential reply message. The model input can take on the form described previously at block 408 of FIG. 4. Process 500 can generate model inputs by representing the text of the potential reply message and/or the remaining messages as an embedding, and then concatenating that text embedding with a feature vector of the contextual data of the potential reply message. Returning to Example A, suppose that the message "Did you have a good day" and "Would you like to eat pizza" are both remaining messages. Then a text embedding can represent these messages and the potential reply message "Yes, I would like to." The form of the model inputs can depend on the architecture or model of the trained machine learning model. In some implementations, the trained machine learning model is a recurrent neural network, where the input recurrence is on the text embedding and feature vector of the contextual data. In other implementations, the trained machine learning model is an ensemble model, where the text embedding can be used as inputs to a recurrent neural network of the ensemble and the feature vector of contextual data can be used as inputs of a deep feedforward neural network of the ensemble. In various implementations, the trained machine learning model is a convolutional neural network cascaded with a recurrent neural network, where the text embeddings and feature vector of contextual data can be used as inputs. The architectures and models described above are examples of possible configurations that the trained machine learning model can be and are not the only ones that process 500 is limited to obtaining.

After generating the model input, process 500 can then compute reply scores for each remaining message by applying the model input to the obtained machine learning model trained to produce reply scores. Each of the reply scores represents how likely the remaining message is the originating message for the potential reply message. The reply score outputted for a remaining message can be a numerical value representing how likely the remaining message is the originating message for the reply message. A higher value can indicate a remaining message is more likely an originating message, while a lower value can indicate a remaining message is less likely an originating message. By producing a reply score, the trained machine learning model can quantify and predict the likelihood of a remaining message as being an originating message for the potential reply message. After producing a reply score for each of the remaining messages, process 400 can identify the remaining message with the highest reply score. Returning to Example A, suppose that the remaining messages after filtering have been applied to the machine learning model. The trained machine learning model can compute the following reply scores: (scores all under 40 generated for remaining unfiltered messages exchanged between User 1 and User 2), score of 40 for the message "Did you have a good day today," and score of 85 for the message "Would you like to eat pizza."

In some implementations, before computing reply scores, process 500 can group the remaining messages that were received by the replying user within a time window of one another. In other words, if a remaining message is received within a time window of another remaining message by the replying user, then process 500 can group them and other messages also in that time window to form a message group. Returning to Example A, suppose two specific messages of the set of messages exchanged between User 1 and User 2 before Tuesday at 5:00:00 PM were received within 1 second of one another. If the time window was predefined to be 2 seconds, then the two specific messages would be grouped together (1 second<2 seconds). The time window can be any predefined threshold time value (e.g., in nanoseconds, milliseconds, seconds, minutes, etc.) fine-tuned to produce the best message groups. Grouping messages can account for scenarios when the potential reply message is potentially replying to more than one of the remaining messages. To group remaining messages, process 500 can combine the text embeddings and/or the feature vectors of contextual data via concatenation, summing, averaging, weighted mean, or any other aggregation method. After grouping remaining messages, process 500 can compute reply scores for the message groups. A higher value can indicate a message group is more likely an originating message group, while a lower value can indicate a message group is less likely an originating message group. By producing a reply score, the trained machine learning model can quantify and predict the likelihood of a message group as being an originating message group for the potential reply message. In some implementations, process 500 can identify the message group with the highest reply score (higher than the reply scores of remaining messages as well).

At block 512, process 500 can determine whether the remaining message or message group with the highest reply score qualifies as an originating message. In some implementations, the remaining message or message group with the highest reply score can qualify when the highest reply score is above a threshold confidence value. A higher threshold confidence value can be defined when a high degree of confidence is desired in selecting originating messages, while a lower threshold confidence value can be defined to make process 500 more flexible in selecting originating messages. In some implementations, the remaining message or message group with the highest reply score qualifies when it is a threshold amount (margin) above all the other reply scores of the remaining messages or message groups. A higher threshold margin can be defined when it is desired that the highest reply score is a decent margin in score above the other reply scores, while a smaller threshold can be defined when flexibility in the margin of error is desired. The thresholds can be predefined numerical values fine-tuned to ensure there is sufficient confidence the remaining message or message group with the highest reply score is the originating message for the potential reply message. Returning to Example A, suppose that the threshold confidence is set to 70 and the threshold margin between reply scores is set to 20. The highest reply score is 85, and since it is above the threshold confidence of 70 and is above the reply scores of all other messages by at least 20 (85−20=65, and 65>40), the message "Would you like to eat pizza" would qualify as the originating message.

When the remaining message with the highest reply score does not qualify, process 500 selects no originating message and process 500 can end. When the remaining message with the highest reply score qualifies, process 500 can select it as the originating message for the potential reply message and process 500 can proceed to block 514.

At block 514, process 500 can cause display of the potential reply message as a reply-to for the remaining message or message group with the highest reply score. In other words, process 500 can cause a visual pairing of the potential reply message with the selected originating message. By causing visual pairing of the messages, a receiving user can visually understand which message the potential reply message is replying to. In some implementations, process 500 can cause the originating message or message group to be displayed directly above the potential reply message. Returning to Example A, process 500 can cause display of the selected originating message "Would you like to eat pizza" directly above the potential reply message "Yes I would like to." In other implementations, process 500 can cause display of an arrow pointing between the potential reply message and the originating message or message group. In Example A, process 500 can cause display an arrow pointing between the potential reply message "Yes I would like to" and the selected originating message "Would you like to eat pizza." After causing display of the reply-to, process 500 can cause display of an interface for the replying user to make a correction to the model selection if needed. In other words, process 500 can provide the replying user the option to give feedback as to how the machine learning model's selection performed. When a user correction is made, process 500 can provide the user correction to process 400 of FIG. 4 at block 402 as additional user-specific messaging data, and process 400 can repeat execution. The described visual elements used to display the potential reply message as a reply to for the originating message are not the only ones that process 500 is limited to.

Figure 6:
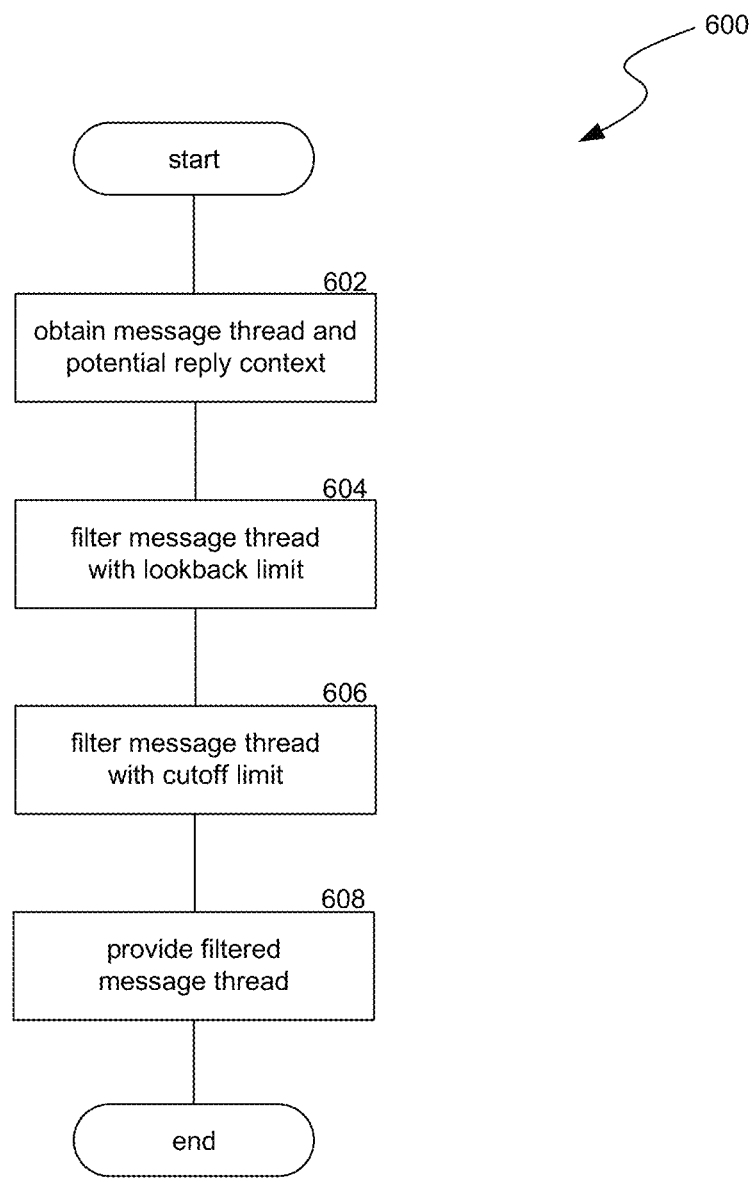
FIG. 6 is a flow diagram illustrating a process used in some implementations for filtering a message thread.

FIG. 6 is a flow diagram illustrating a process 600 used in some implementations for filtering a message thread. In some implementations, process 600 can be performed in response to process 500 of FIG. 5 performing block 504 to filter a message thread based on the context of the potential reply message. In various implementations, process 600 can be performed on a server device (e.g., a server of a messaging platform that communicates messages sent between users, processes messaging data between different users, and can compute reply scores for messages) or a client device (e.g., a user device for sending messages to and/or receiving messages from other user devices on a messaging platform, processes messaging data communicated with other user devices, and can compute reply scores for messages). Process 600 can be performed on a client device to maintain privacy of user-specific messaging data and account for instances when the client device is offline and cannot be connected to a server.

At block 602, process 600 can obtain a message thread and the context of the potential reply message (potential reply context) from process 500 of FIG. 5 at blocks 504 and 506. The message thread can contain messages to be filtered based on the context of the potential reply message, such as timing features, user device context, and/or user attention as described in relation to block 404 of FIG. 4.

At block 604, process 600 can filter messages of the message thread with a lookback limit. The lookback limit can remove messages that were not on the screen of the replying user within a threshold time of when they begin typing the potential reply message. In other words, process 600 can remove messages with timestamps that are not seen on the replying user's screen recently enough and perhaps too old from when the replying user is responding. The lookback limit can be a predefined amount of time a message has to be most recently seen or "looked-back" at by the replying user on their screen. The time that messages of the message thread appeared on the replying user screen can be determined from the context based on contextual data including, but not limited to, timing features, user device context, and/or user attention. In some implementations, the time a message appeared on the replying user screen is when they received the message. In other implementations, the time a message appeared on the replying user screen is when the replying user last opened the message and the message was presented to the user (e.g., message was on replying user's screen when they opened the message thread, replying user scrolled up to the message). In various implementations, the time a message appeared on the replying user screen is when the replying user most recently looked directly at a message according to user attention contextual data (e.g., tracking where replying user looked). By filtering based on a lookback limit, process 600 can remove older messages in the message thread history that are unlikely to be the originating message since the replying user has not seen them for a while. For example, suppose process 600 obtains the following message thread: User 1 sends a first message asking "Did you have a good day today" on Tuesday at 5:00 PM and User 1 sends a second message asking "Would you like to eat pizza" on Wednesday at 9:00 AM. If the lookback limit is 12 hours and the first message from User 1 was last seen by User 2 more than 12 hours ago, then the first message from User 1 would be filtered out in this example.

At block 606, process 600 can filter messages of the message thread with a cutoff limit. The cutoff limit can remove messages that were received after the replying user started typing the potential reply message. In other words, process 600 can "cutoff" any messages with received timestamps after that of when the potential reply message was starting to be typed. By filtering based on a cutoff limit, process 600 can remove messages that are unlikely to be the originating message since they come after a user begins typing a potential reply message (a user wouldn't likely start replying to a message that doesn't exit yet). For example, suppose the automated messaging reply-to system obtains the following message thread: User 1 sends a first message asking "Did you have a good day today" on Tuesday at 5:00:00 PM and User 1 sends a second message asking "Would you like to eat pizza" on Tuesday at 5:00:11 PM. If User 2 starts typing a potential reply message at 5:00:10 PM of the same day, the second message from User 1 would be filtered out in this example because the second message was sent 1 second after User 1 started typing. In some implementations, a message removed by the cutoff limit can still be included in a message group at block 510 of FIG. 5. In various implementations, the cutoff limit can allow for a message to not be removed if it is received after the user began typing the potential reply message within a threshold time limit (e.g., nanoseconds, milliseconds, seconds). This can account for scenarios when the replying user starts typing the potential reply message, sees a new message sent by the other user after they begin typing, and then modifies their potential reply message as they are typing it to answer the new message instead.

At block 608, process 600 can provide the remaining messages (unfiltered messages) of the filtered message thread for further processing. Process 600 can provide the remaining messages to process 500 of FIG. 5 at block 508 so that process 500 can compute reply scores for the remaining messages.

Figure 7:
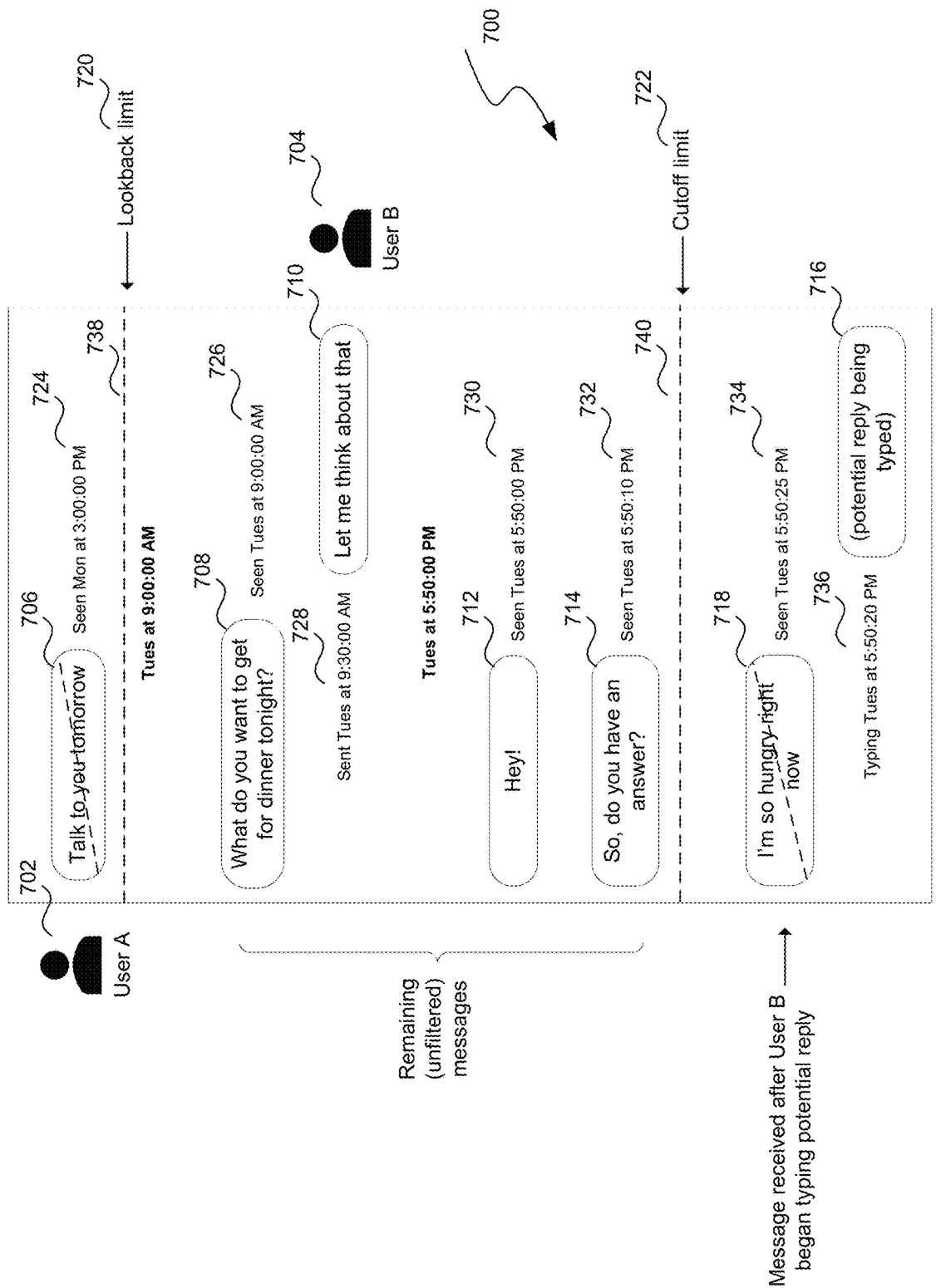
FIG. 7 is a conceptual diagram illustrating an example of a message thread with timestamps showing messages to be removed by filtering.

FIG. 7 is a conceptual diagram illustrating an example 700 of a message thread with timestamps showing messages to be removed by filtering. Example 700 includes a User A 702 and a User B 704 exchanging messages on a messaging platform. User A has sent messages 706, 708, 712, 714, and 718 to User B, while User B has sent message 710 to User A and is currently typing potential reply message 716. Example 700 further includes a lookback limit 720 and cutoff limit 722 to filter messages 706, 708, 710, 712, 714, and 718 based on their "seen" timestamps 724, 726, 728, 730, 732, and 734 respectively. The "seen" timestamp can be when User B received the message, when User B was most recently presented with the message on their screen (e.g., appeared on screen when User B opened example 700, User B scrolled up to the message), or when User B looked directly at the message. In example 700, lookback limit 720 is set to 24 hours from User B's current time as he/she is currently typing potential reply message 716, so any message with a "seen" timestamp earlier than Monday at 5:50:20 PM is removed (24 hours from Tuesday at 5:50:20 PM—when User B started replying 736). Lookback limit 720 can remove any message above the dashed line 738, which includes removing message 706 (crossed out by a dashed line) since it has a "seen" timestamp earlier than lookback limit 720 (Monday at 3:00:00 PM is earlier than the lookback limit of Monday at 5:50:20 PM).

In example 700, cutoff limit 722 is set to when User B started replying 736, so any message from User A with a "seen" timestamp after the cutoff limit 722 of Tuesday at 5:50:20 PM is removed. Cutoff limit 722 can remove any message from User A below the dashed line 740, which includes removing message 718 from User B (crossed out by a dashed line) since it has a "seen" timestamp later than cutoff limit 722 (Tuesday at 5:50:25 PM is later than the cutoff limit of Tuesday at 5:50:20 PM). Message 718 was received by User B after User B began typing potential reply message 716, hence why it can be removed by the cutoff limit. Messages 708, 710, 712, and 714 are remaining messages that are unfiltered by the cutoff limit and lookback limit.

Figure 8:
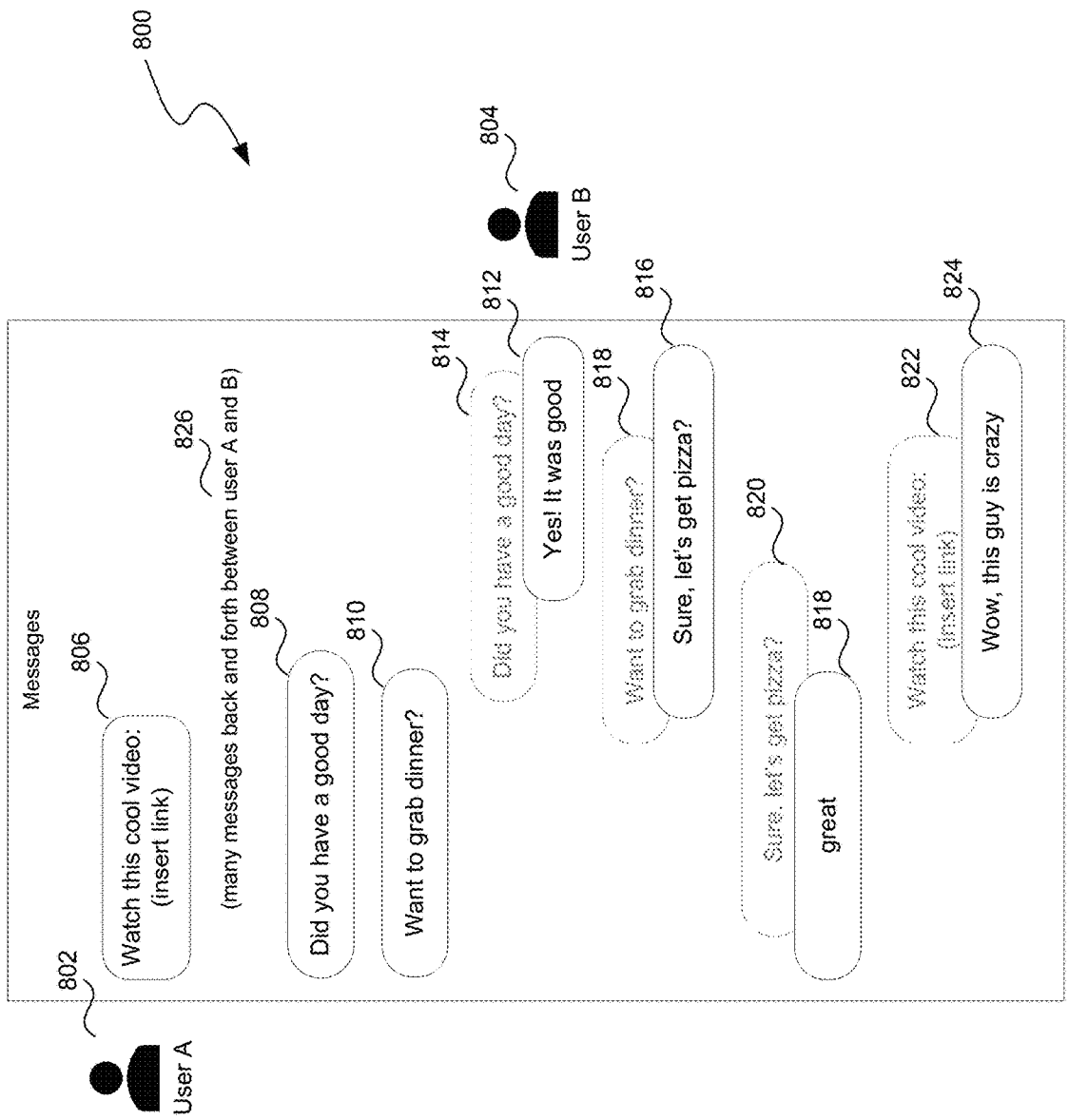
FIG. 8 is a conceptual diagram illustrating an example of a user interface with messages shown as originating messages.

FIG. 8 is a conceptual diagram illustrating an example 800 of a user interface with messages shown as originating messages. Example 800 includes a User A 802 and a User B 804 exchanging messages on a messaging platform. User A has sent messages 806, 808, 810, and potential reply message 818 to User B, while user B has sent potential reply messages 812, 816, and 824 to User A. Unshown in example 800 are many messages exchanged back and forth between User A and User B in 826 between the times message 806 and message 808 were sent/received by the users (preserving space in this example). Messages 806, 826, 808, and 810 can be candidates for the originating message for potential reply message 812; messages 806, 826, 808, 810 and 812 can be candidates for the originating message for potential reply message 816; messages 806, 826, 808, 810, 812 and 816 can be candidates for the originating message for potential reply message 818; and messages 806, 826, 808, 810, 812, 816, and 818 can be candidates for the originating message for potential reply message 824. Message 808 is selected as the originating message 814 for potential reply message 812 and is displayed directly above potential reply message 812. Message 810 is selected as the originating message 818 for potential reply message 816 and is displayed directly above potential reply message 816. Message 816 is selected as the originating message 820 for potential reply message 818 and is displayed directly above potential reply message 818. Message 806 is selected as the originating message 822 for potential reply message 824 and is displayed directly above potential reply message 824.

Figure 9:
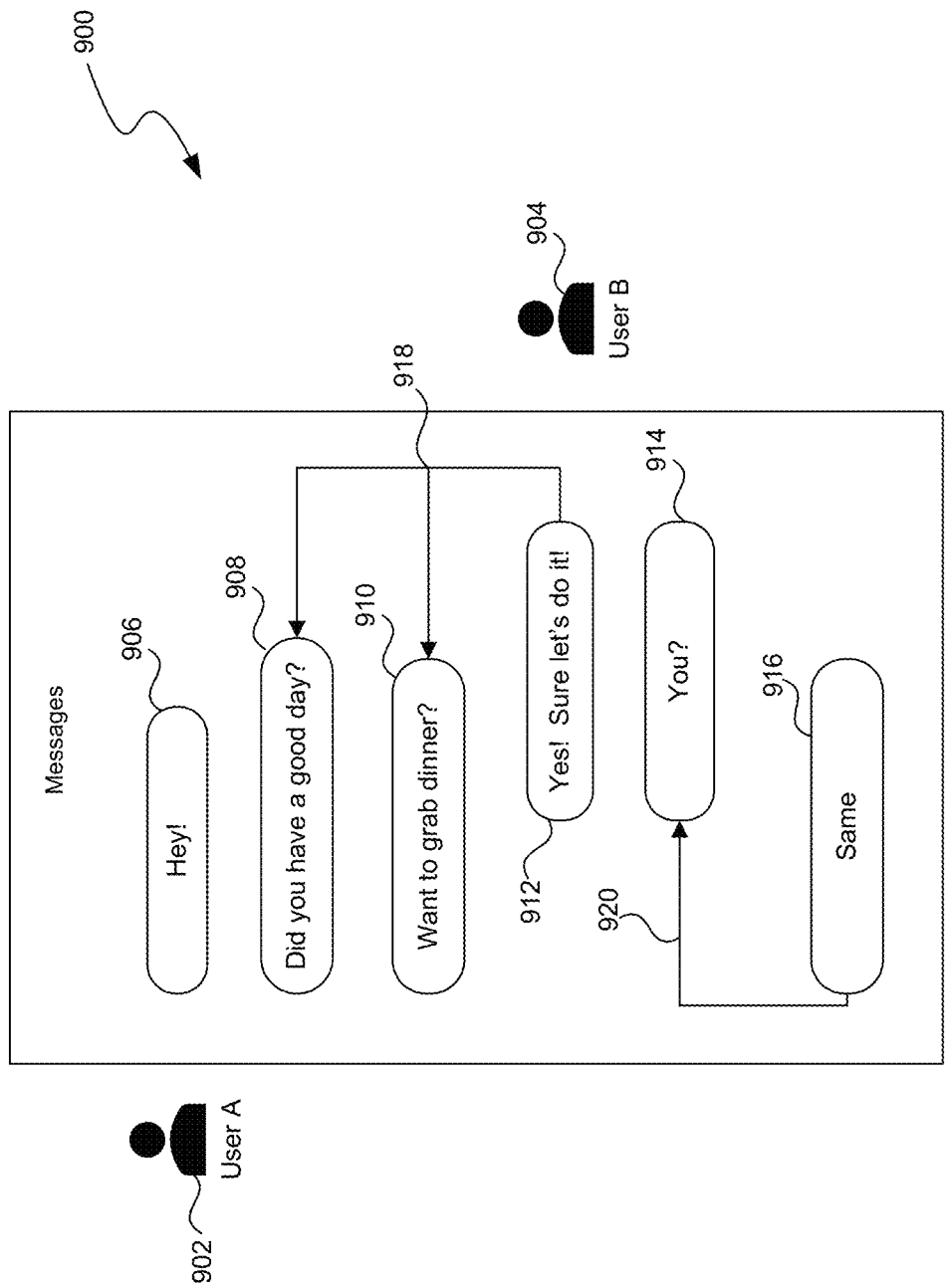
FIG. 9 is a conceptual diagram illustrating an example of a user interface with arrows showing messages as replies to other messages.

FIG. 9 is a conceptual diagram illustrating an example 900 of a user interface with arrows showing messages as replies to other messages. Example 900 includes a User A 902 and a User B 904 exchanging messages on a messaging platform. User A has sent messages 906, 908, 910, and potential reply message 916 to User B, while User B has sent potential reply messages 912 and 914 to user A. Messages 906, 908, and 910 can be candidates for the originating message for potential reply message 912; messages 906, 908, 910, and 912 can be candidates for the originating message for potential reply message 914; and messages 906, 908, 910, 912 and 914 can be candidates for the originating message for potential reply message 916. Messages 908 and 910 are selected as the originating message group for potential reply message 912, and an arrow 918 pointing between them can be displayed. No originating message is selected for potential reply message 914. Message 914 is selected as the originating message for potential reply message 916, and an arrow 920 pointing between them can be displayed.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for pairing messages sent in a message thread by selecting which originating messages in the message thread match reply messages in the message thread as automatic reply-to results, the method comprising:
   obtaining a message thread containing two or more messages;
   obtaining a potential reply message and a context of the potential reply message, wherein the potential reply message is in the message thread and is a potential reply to one or more of the two or more messages in the message thread;
   identifying one or more remaining messages by filtering, based on the context of the potential reply message, at least one message out of the two or more messages in the message thread;
   generating a reply score for each of the one or more remaining messages and/or for groups of the one or more remaining messages, by:
      generating model input based on: the potential reply message from the message thread, one or more of the remaining messages of the two or more messages from the message thread, and at least part of the context of the potential reply message; and
      applying the model input to a machine learning model trained to produce reply scores;
   identifying a remaining message or message group with a highest reply score;
   determining that the remaining message or message group with the highest reply score qualifies as an originating message being replied to; and
   in response to the determining that the originating message or message group with the highest reply score qualifies:
      pairing the potential reply message with the originating message or message group with the highest reply score such that the potential reply message, in the message thread, is identified as a reply to the originating message or message group with the highest reply score; and
      causing display of the potential reply message as a reply-to for the originating message or message group with the highest reply score.

2. The method of claim 1, wherein the filtering is performed by removing messages, of the two or more messages, that were not on a replying user screen within a threshold time.

3. The method of claim 1, wherein the filtering is performed by removing messages, of the two or more messages, that were received after a replying user started typing the potential reply.

4. The method of claim 1, wherein the remaining message with the highest reply score qualifies as the originating message being replied to when the highest reply score is above a threshold confidence value.

5. The method of claim 1, wherein the remaining message with the highest reply score qualifies as the originating message being replied to when the highest reply score is a threshold amount above all other reply scores of the one or more remaining messages.

6. The method of claim 1, wherein the machine learning model is trained to produce reply scores by:
   obtaining a set of reply-to instances;
   obtaining a corresponding context for each of the set of reply-to instances;
   obtaining the machine learning model for training;
   generating a set of model inputs based on: the set of reply-to instances and the corresponding contexts for the set of reply-to instances;
   applying the set of model inputs and/or groups of the set of model inputs to the machine learning model and updating one or more model parameters; and
   providing the machine learning model trained to produce reply scores.

7. The method of claim 1,
   wherein the context of the potential reply message comprises one or more text features of the potential reply message and/or the two or more messages; and
   wherein the one or more text features are based on: message lengths, words contained, part-of-speech tags, type analysis, or any combination of thereof.

8. The method of claim 1,
   wherein the context of the potential reply message comprises results of an analysis of associated content items in the potential reply message and/or the two or more messages;
   wherein the analysis of associated content items is performed by:
      determining the potential reply message and/or two or more messages contain a content item comprising: a link, a picture, a video, or any combination of thereof; and
      identifying, in relation to the content item, an object identification tag, a hash tag, a topic identifier, a video length, a sound length, who posted on social media, who liked a social media post, or any combination of thereof.

9. The method of claim 1, wherein the context of the potential reply message comprises one or more timing features based on: when the potential reply message was sent, when one or more of the two or more messages were read, how much time one or more of the two or more messages stayed in focus on a replying user screen, or any combination thereof.

10. The method of claim 1, wherein the context of the potential reply message comprises device context based on: where the user was when the potential reply message was sent and/or whether the potential reply message was sent after a period of internet disconnection.

11. The method of claim 1, wherein the context of the potential reply message comprises an indication of attention by a replying user, determined by:
   using a camera to compute where the replying user is looking; and
   determining, based on where the replying user is looking:
      one or more of the two or more messages the replying user is looking at during a given time, and/or
      how much time the replying user spent looking at one or more of the two or more messages.

12. The method of claim 1, wherein causing display of the potential reply message as a reply-to for the remaining message or message group is performed by:
   causing the originating message or message group to be displayed directly above the potential reply message; or
   causing display of an arrow pointing between the potential reply message and the originating message or message group.

13. A non-transitory computer-readable storage medium storing instructions that, when executed by a computing system, cause the computing system to perform a process for associating messages sent in a message thread by selecting which originating messages in the message thread match reply messages in the message thread as automatic reply-to results, the process comprising:
   obtaining a message thread containing two or more messages;
   obtaining a potential reply message and a context of the potential reply message, wherein the potential reply message is in the message thread and is a potential reply to one or more of the two or more messages in the message thread;
   identifying one or more remaining messages by filtering, based on the context of the potential reply message, at least one message out of the two or more messages in the message thread;
   generating a reply score for each of the one or more remaining messages and/or for groups of the one or more remaining messages, by:
      generating model input based on: the potential reply message from the message thread, one or more of the remaining messages of the two or more messages from the message thread, and at least part of the context of the potential reply message; and
      applying the model input to a machine learning model trained to produce reply scores;
   identifying a remaining message or message group with a highest reply score;
   determining that the remaining message or message group with the highest reply score qualifies as an originating message being replied to; and
   in response to the determining that the originating message or message group with the highest reply score qualifies, causing display of the potential reply message as a reply-to for the originating message or message group.

14. The non-transitory computer-readable storage medium of claim 13, wherein each of the groups of the one or more remaining messages comprise messages that have been received within a specified time window of each other.

15. The non-transitory computer-readable storage medium of claim 13, further comprising:
   receiving a set of user-specific messaging data comprising one or more manual reply-to instances and/or one or more user corrections to model selections of originating messages being replied to;
   wherein the machine learning model is trained to produce reply scores by:
      generating a set of model inputs based on: the one or more manual reply-to instances and/or the one or more user corrections to model selections of originating messages being replied to;
      applying the set of model inputs to the machine learning model and updating one or more model parameters; and
      providing the machine learning model trained to produce reply scores.

16. The non-transitory computer-readable storage medium of claim 13, wherein the filtering is performed by removing messages, of the two or more messages, that were not on a replying user screen within a threshold time.

17. The non-transitory computer-readable storage medium of claim 13, wherein the filtering is performed by removing messages, of the two or more messages, that were received after a replying user started typing the potential reply.

18. A computing system for associating messages sent in a message thread by selecting which originating messages in the message thread match reply messages in the message thread as automatic reply-to results, the computing system comprising:
   one or more processors; and
   one or more memories storing instructions that, when executed by the one or more processors, cause the computing system to perform a process comprising:
      obtaining a message thread containing two or more messages;
      obtaining a potential reply message and a context of the potential reply message, wherein the potential reply message is in the message thread and is a potential reply to one or more of the two or more messages;
      generating a reply score for each particular message, of multiple of the two more messages, wherein each reply score specifies an expected level of match for the potential reply message, from the message thread, having been created as a reply to the particular message, from the message thread;
      identifying a message or message group with a highest reply score as an originating message or message group;
      associating the potential reply message with the originating message or message group such that the potential reply message, in the message thread, is identified as a reply to the originating message or message group; and
      causing display of the potential reply message as a reply-to for the originating message or message group with the highest reply score.

19. The computing system of claim 18, wherein the identifying the message or message group with the highest reply score as the originating message or message group further comprises determining that the originating message with the highest reply score qualifies as the message being replied to by determining that the highest reply score is above a threshold confidence value.

20. The computing system of claim 18, wherein the generating each of the reply scores for each particular message of the two more messages comprises:
   generating model input based on at least the particular reply message from the message thread and the potential reply message from the message thread; and
   applying the model input to a machine learning model trained to produce reply scores.

* * * * *